United States Patent
Hozumi et al.

(10) Patent No.: US 6,896,993 B2
(45) Date of Patent: May 24, 2005

(54) ELECTROCHEMICAL DEVICE COMPRISING A PAIR OF ELECTRODES AND AN ELECTROLYTE

(75) Inventors: Yoshihiro Hozumi, Yokohama (JP); Katsuji Ikeda, Yokohama (JP); Masami Kashihara, Yokohama (JP); Tomonori Aoki, Yokohama (JP); Makato Inoue, Yokohama (JP)

(73) Assignee: Asahi Glass Company, Limited, Tokyo (JP)

(*) Notice: Subject to any disclaimer, the term of this patent is extended or adjusted under 35 U.S.C. 154(b) by 96 days.

(21) Appl. No.: 10/108,485

(22) Filed: Mar. 29, 2002

(65) Prior Publication Data

US 2002/0110729 A1 Aug. 15, 2002

Related U.S. Application Data

(63) Continuation of application No. PCT/JP00/06722, filed on Sep. 28, 2000.

(30) Foreign Application Priority Data

Sep. 30, 1999 (JP) .......................................... 11-278841

(51) Int. Cl.$^7$ ................................................. H01M 2/18
(52) U.S. Cl. ........................ 429/130; 429/131; 429/133; 361/502
(58) Field of Search ................................ 429/130, 131, 429/133; 361/502

(56) References Cited

U.S. PATENT DOCUMENTS

| | | | |
|---|---|---|---|
| 3,475,226 A | | 10/1969 | Fraioli |
| 4,332,867 A | * | 6/1982 | Tsuda et al. .................. 429/94 |
| 4,395,747 A | | 7/1983 | White |
| 4,554,227 A | | 11/1985 | Takagaki et al. |
| 5,588,970 A | | 12/1996 | Hughett et al. |
| 6,222,720 B1 | * | 4/2001 | Aoki et al. ............... 361/301.5 |
| 6,264,707 B1 | | 7/2001 | Ishikawa et al. |

FOREIGN PATENT DOCUMENTS

| | | |
|---|---|---|
| EP | 0 771 040 | 5/1997 |
| EP | 0 878 855 | 11/1998 |
| EP | 0 924 723 | 6/1999 |
| EP | 0 948 066 | 10/1999 |
| EP | 0 969 538 | 1/2000 |
| GB | 1055362 | 1/1967 |
| JP | 8-329958 | 12/1996 |
| JP | 9-92335 | 4/1997 |
| JP | 9-92338 | 4/1997 |
| JP | 11-238500 | 8/1999 |
| JP | 11-243035 | 9/1999 |
| JP | 2000-40502 | 2/2000 |
| JP | 2000-260417 | 9/2000 |
| WO | WO 96/01505 | 1/1996 |

OTHER PUBLICATIONS

Patent Abstracts of Japan, JP 10–275751, Oct. 13, 1998.
E. Dekker, Electronic Components and Applications, vol. 8, No. 4, pp. 194–206, XP–000003985, "Sal Capacitors for Automotive Applications", 1988.

* cited by examiner

*Primary Examiner*—Dah-Wei Yuan
(74) *Attorney, Agent, or Firm*—Oblon, Spivak, McClelland, Maier & Neustadt, P.C.

(57) ABSTRACT

An electrochemical device comprises a pair of electrodes having electrode layers formed on strip-like collectors except on their strip-like portions along a longitudinal side of the strip-like collectors; strip-like separators insulating these; two collector plates connected to the strip-like portions; a case accommodating these; a lid for sealing the case; a pair of terminals connected to the collector plates and being connectable to an outside of the case. The pair of terminals is respectively connected to the lid and the case, and the pair of electrodes are wound interposing the separators therebetween, and the strip-like portions are located on both end surfaces. The electrochemical device has high volume density and low internal resistance and it can be manufactured in short time.

20 Claims, 11 Drawing Sheets

F I G. 3 (a)
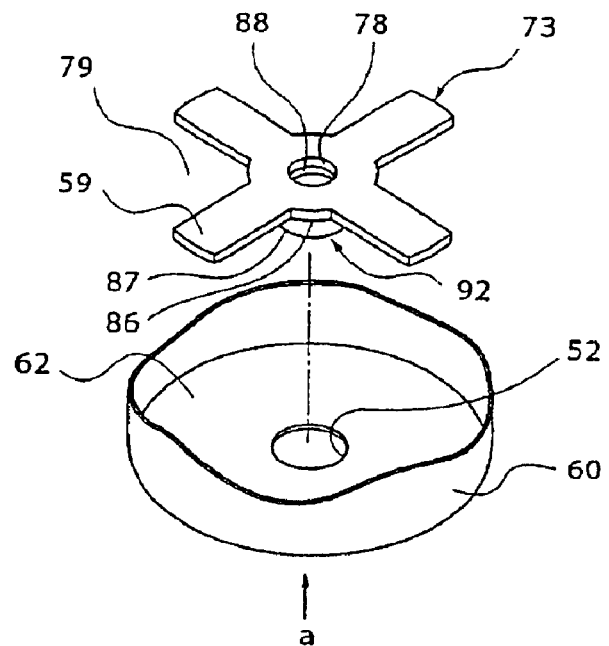
F I G. 3 (b)
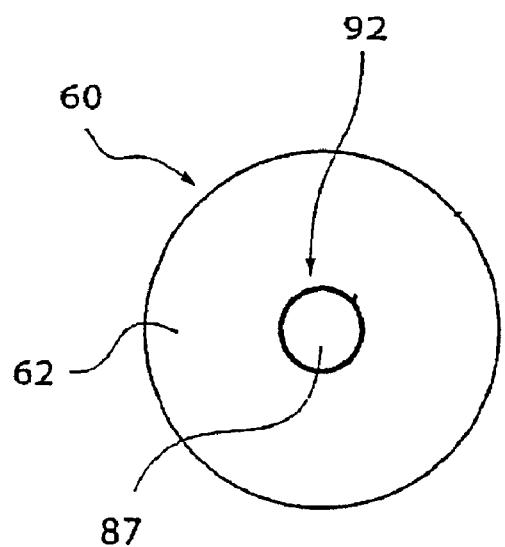

ELECTROCHEMICAL DEVICE COMPRISING A PAIR OF ELECTRODES AND AN ELECTROLYTE

This application is a continuation of International Application Serial No. PCT/JP00/06722, filed Sep. 28, 2000, and is based upon and claims the benefit of priority from the prior Japanese Patent Application No. 11-278841, filed Sep. 30, 1999, the entire contents of each of which are incorporated herein by reference.

TECHNICAL FIELD

The present invention relates to an electrochemical device such as an electric double layer capacitor and a secondary battery using a non-aqueous, in particular to an electrochemical device having wound electrodes.

BACKGROUND ART

In accordance with the recent development of electrical engineering, electronic apparatuses are miniaturized, become highly performable, and become portable. Therefore, electrochemical devices used as a power source for electronic apparatuses become more compact and less-weighted and demonstrate higher performance. Especially, chargeable secondary battery is increasingly used. The conventionally used secondary battery is, for example, NiCd battery and nickel hydride battery. More recently, secondary battery using a non-aqueous electrolyte such as lithium secondary battery and lithium ion secondary battery is used because it has higher energy density. Meanwhile it is tried to use electric double layer capacitor as a power source because of its high output.

In a conventional technique, one example of structures of secondary battery using a non-aqueous electrolyte and having a large capacity and a high energy density is a cylindrical structure as illustrated in FIG. 11. As illustrated, a winding element formed by winding a pair of strip-like electrodes, i.e. specifically a positive electrode 2 made by forming layers including a positive electrode activating agent on both sides of a metallic collector and a negative electrode 3 made by forming layers including a negative electrode activating agent on both sides of a metallic collector, interposing strip-like separators 4, 4' therebetween, is accommodated in a metallic case in a form of bottomed cylinder and subjected to impregnation with an electrolyte. Thereafter, collecting leads 6, 6' drawn out of the positive electrode 2 and the negative electrode 3 are respectively connected to electrode terminals 9, 9', formed in an electrically insulative sealing lid 8, and the sealing lid is engaged with the metallic case 5.

As used above and throughout the remainder of the specification, "strip-like" is to be understood to mean "strip shaped."

In the case of the above-described electrochemical device, the production time becomes long because a step of processing the leads is onerous.

Further, it is necessary to provide an additional space for accommodating the collecting leads in the case, whereby the winding element becomes small as much. Therefore, the volume density per a unit volume of the case was inevitably low. Further, because the electrolyte is injected after the winding element is accommodated in the case and the opening portion of the case is sealed by the sealing lid, a substantial time is necessary to inject the electrolyte. Further, an electrochemical device having a smaller internal resistance is desired.

An object of the present invention is to provide an electrochemical device, wherein the production time is short, the capacity density per a unit volume is high, an electrolyte is injected thereinto in a short time, and the internal resistance is small.

DISCLOSURE OF THE INVENTION

In order to attain the above object, as illustrated in FIG. 1, 8, and 9, the electrochemical device 11 according to the present invention comprises: a first electrode 31 having electrode layers 31b and 31c on at least one of the surfaces of a strip-like first collector 31a other than a first strip-like portion 31ax along a side of a strip-like longitudinal direction of the first collector 31a; a second electrode 32 having electrode layers 32b and 32c formed on at least one of the side surfaces of a strip-like second collector 32a other than a second strip-like portion 32ax along a side of a strip-like longitudinal direction of the second collector 32a; strip-like separators 33a and 33b electrically insulating the first electrode 31 from the second electrode 32 by intervening therebetween; a first collector plate 72 being in contact with the first strip-like portion 31ax and collecting electricity from the contact; a second collector plate 73 being in contact with the second strip-like portion 32ax and collecting electricity from the contact; a case 60 having an opening portion for accommodating the first electrode 31, the second electrode 32, the separators 33a and 33b, the first collector plate 72, and the second collector plate 73; a sealing lid 63 for sealing the opening portion; a first terminal 91 connected to the first collector plate 72 or monolithically formed with the first collector plate 72 so as to be connected to an outside of the case 60; and a second terminal 92 connected to the second collector plate 73 or monolithically formed with the second collector plate 73 so as to be connected to the outside of the case 60, wherein the first terminal 91 and the second terminal 92 are respectively connected to the sealing lid 63 and the case 60, the first electrode 31, the second electrode 32, and the separators 33a and 33b are overlapped and wound to form a tubiform winding element 50, the first strip-like portion 31ax and the second strip-like portion 32ax are arranged respectively on opposite end surfaces of the cylindrical winding element 50.

By constructing as such, the strip-like portion of the first electrode and the strip-like portion of the second electrode of the tubiform winding element are wound so as to be located on the opposite end surface of the tubiform winding element, and the first collector plate and the second collector plate are respectively connected to the strip-like portions of the first and the second electrodes. Therefore, it is unnecessary to especially provide a tab-like collecting lead, and the strip-like portions themselves function as collecting leads, whereby the process is facilitated and the production time is shortened.

Further, because the first collector plate and the first terminal are connected or constructed as an integral object, or the second collector plate and the second terminal are connected or constructed as an integral object, it is possible to make the electrochemical device firm.

Further, because a space for accommodating a tab-like collector lead is not required, the volume density per a unit volume of the electrochemical device can be increased. Further, because of the above-described connecting structure, it is possible to determine a relative position of the first collector plate and the second collector plate in the axial direction. Therefore, it is possible to set a gap between the two collector plates a predetermined value. Further, it is possible to maintain the contact between the strip-like portions and the collector plates without causing excessive approach or separation between the two collector plates, caused by vibration in using the electrochemical device, generation of gas inside the electrochemical device, and so on.

Further, since the first terminal and the second terminal respectively connect the sealing lid with the case, it is possible to secure sealing in the connecting portion, to make the electrochemical device further firm, and to further reduce the electric resistance.

Further, it is preferable to connect the first strip-like portion 31ax and the second strip-like portion 32ax respectively to the first collector plate 72 and the second collector plate 73 by welding and to crush the wound first strip-like portion 31ax and the wound second strip-like portion 32ax toward the axis of tube of the tubiform winding element 50.

By constructing as such, when the connections respectively between the first strip-like portion 31ax and the first collector plate 71 and between the first strip-like portion 32ax and the second collector plate 72 is welded variation of the internal resistance is restricted, variation of the electrical resistance caused by long-term vibration or the like is securely restricted. The crushing of the strip-like portions against the collector plates with pressure makes a contact area between the strip-like portion and the collector plate large, whereby the welding is secured.

Further, in the above electrochemical device 11, it is preferable that materials of the first collector 31a, the first collector plate 72, and the first terminal 91 are the same, and materials of the second collector 32a, the second collector plate 73 and the second terminal 92 are the same. By using the same material for these parts, it is possible to connect these by ultrasonic welding, laser welding, or electron beam welding, whereby the internal resistance of the electrochemical device 11 is reduced.

Further, it is preferable that the electrochemical device 11 includes a core 40 penetrating through a center portion of the tubiform winding element 50, the first terminal 91 or the second terminal 92 have an inlet 95 for the electrolyte and a hollow path 94 through which the electrolyte flows; and the core 40 has an inflow port 38, to which the electrolyte flows from a connection with the hollow path 94, an outflow port 39, from which the electrolyte flows out, and a hollow cavity 44 connecting the inflow port 38 to the outflow port 39. Further, it is preferable that the first collector plate 72 or the second collector plate 73 has a cutout 75 or 79 or a hole, through which the electrolyte flows to the cylindrical winding element 50.

By constructing as such, the electrolyte injected from the inlet passes through the hollow path and the hollow cavity, and flows from both surfaces of the tubiform winding element from the cutout to the tubiform winding element. Therefore, it is possible to supply the electrolyte all over the cylindrical winding element within a short time.

BRIEF DESCRIPTION OF THE DRAWINGS

FIG. 3: Views for explaining assembling of a negative collector plate and a negative outer terminal and attachment of a negative collector plate to a case

BEST MODE FOR CARRYING OUT THE INVENTION

Hereinbelow, embodiments of the present invention will be described in reference of figures. In the figures, the same or similar references are used for mutually the same or similar parts, and overlapping description is omitted. Further, in the following description, terminologies "upper", "lower" used like "upper portion", "lower portion", "upper end", or "lower end" are used based on an up-and-down relationship in the figure for convenience. Therefore, in actual assembling work and actual use, it may stand from side to side or upside down.

Figure 1:
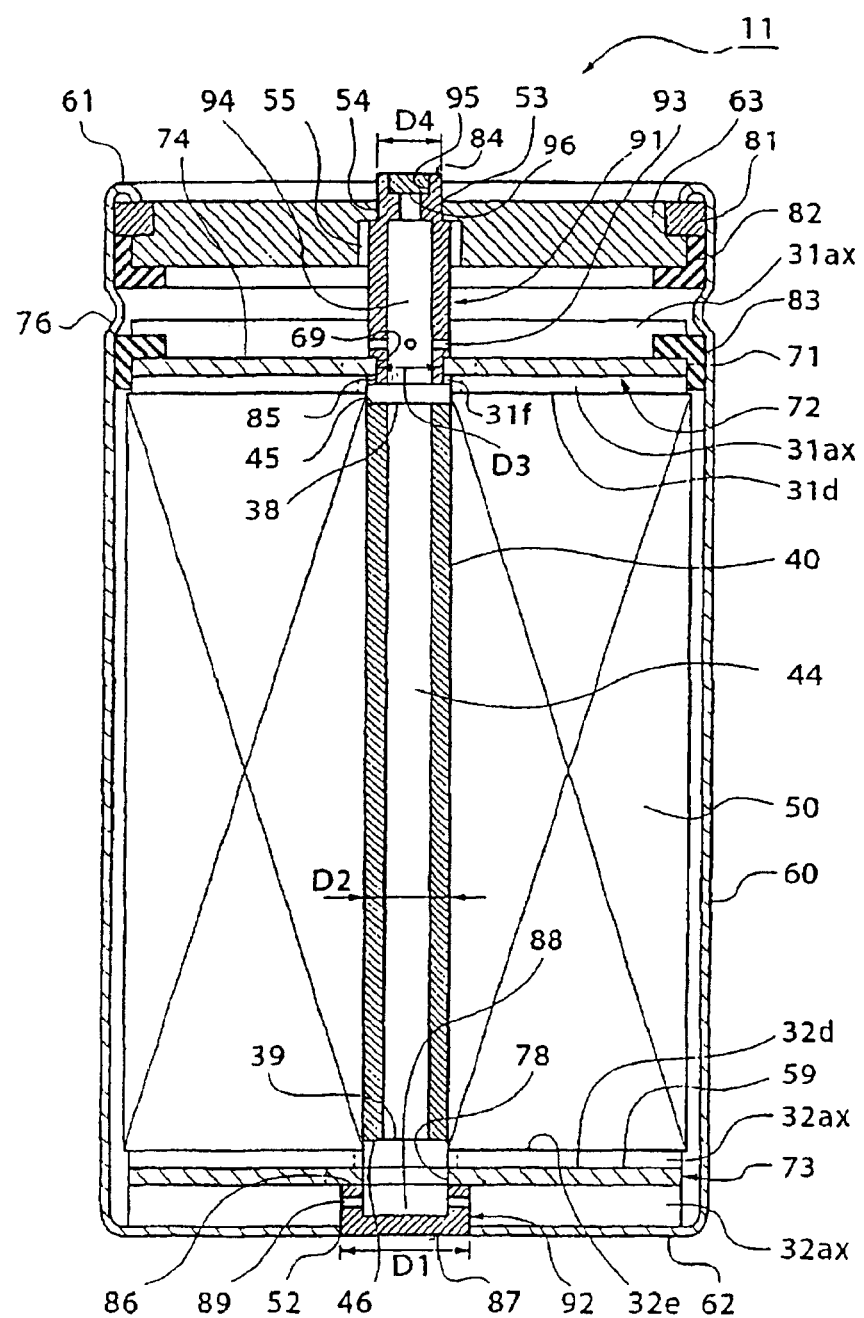
FIG. 1: A schematical cross-sectional view of an electrochemical device according to Embodiment 1 of the present invention
Figure 8:
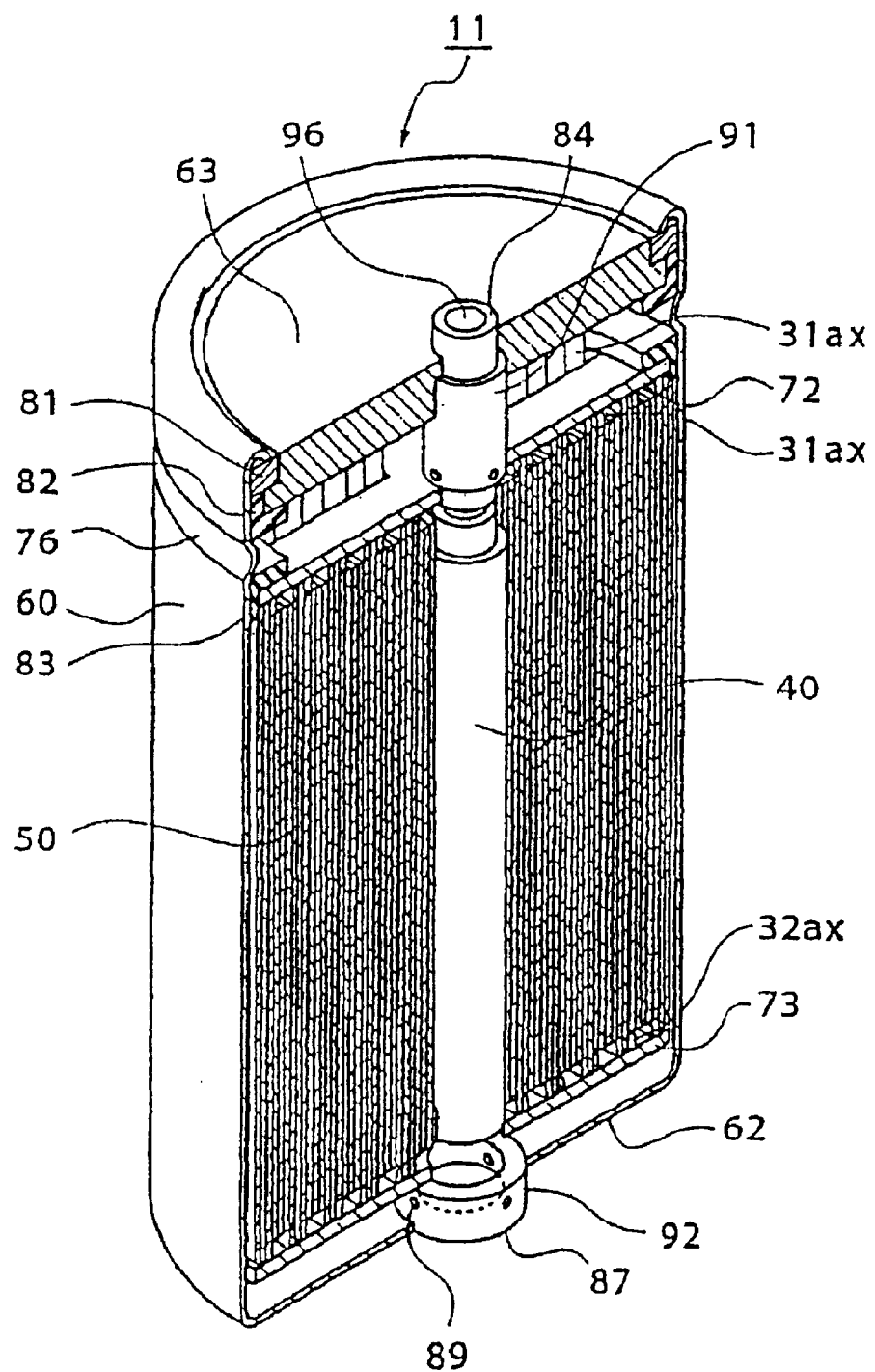
FIG. 8: A perspective cross-sectional view illustrating detail of the structure of the electrochemical device illustrated in FIG. 1
Figure 9:
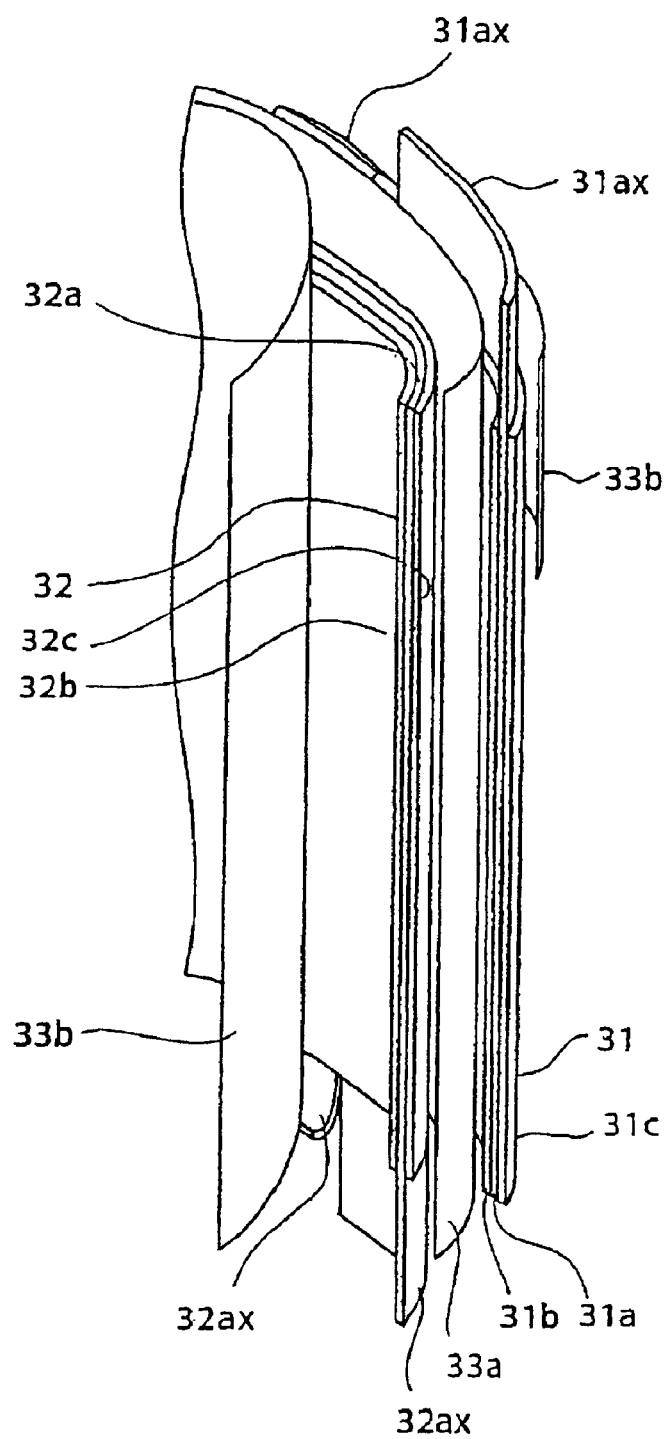
FIG. 9: An exploded perspective view illustrating parts of the positive electrode and the negative electrode of the electrochemical device illustrated in FIG. 1

FIG. 1 is a cross-sectional view of an electrochemical device 11 according to Embodiment 1 of the present invention. FIG. 8 is a perspective view illustrating a detail of Embodiment 1, and FIG. 9 is a perspective view partly broken down for partly showing a positive electrode 31 and a negative electrode 32 in detail. In FIG. 9, the positive electrode 31 positioned in the outermost side and the negative electrode 32 positioned inside thereof are shown. Embodiment 1 will be described properly in reference of FIGS. 1, 8 and 9. In the electrochemical device, an electric double layer capacitor, a non-aqueous electrolyte secondary battery, or the like is included.

The electrochemical device 11 has a case 60 in a substantially cylindrical shape. The upper portion of the case 60 is in an opening structure, wherein the opening is covered by a sealing lid 63 in a disk-like shape having an upper aperture 53 (diameter D4) in a center thereof. In the lower portion, a bottom portion 62 is provided, wherein a bottom aperture 52 (diameter D1) in a circular shape is machined in a center of the bottom portion 62. A winding element 50 being a cylindrical tubiform winding element as a whole is accommodated inside the case 60. The tubiform winding element is not limited to a cylindrical shape and may be in a tubiform of which bottom surface is a humilis-shape or an ellipse-shape. In this case, it is better to make the bottom surface of the case a humilis-shape or an ellipse-shape in correspondence with the shape of the bottom surface of the winding element.

The winding element 50 is formed by piling and winding the positive electrode 31 as a first electrode and the negative electrode 32 as a second electrode interposing the strip-like separators 33a and 33b (FIGS. 8 and 9). The positive electrode 31 is constructed that an electrode layer 31b is formed on one surface of a strip-like collector 31a as a first collector, an electrode layer 31c is formed on the other surface, and a strip-like portion 31ax as a first strip-like portion is left along an upper side in FIG. 9, being a side in a strip-like longitudinal direction. A negative electrode 32 is constructed in a completely similar manner such that the electrode layer 31b and the electrode layer 31c are formed in the strip-like collector 32a as a second collector leaving a strip-like portion 32ax as a second strip-like portion positioned along a lower side in FIG. 9, being a side in a strip-like longitudinal direction.

In the positive electrodes 31, the electrode layers 31b and 31c are formed in a strip-like shape so as to have substantially the same widths in regions corresponding to the front and the back of the strip-like collector 31a. The structure is similar in the negative electrode 32.

The widths of the positive electrode layers 31b and 31c are substantially the same as the widths of the negative electrode layers 32b and 32c. Further, separators 33a and 33b are wider than the widths of the electrode layers 31b, 31c, 32b and 32c. For example, the widths of the separators 33a and 33b are substantially the same as those of the electrodes 31 and 32. When the positive electrode 31, the negative electrode 32, and the separators 33a and 33b are piled and wound, the winding is such that the positive electrode layer and the negative electrode layer are substantially overlapped in their width directions, the centerlines of the separators 33a and 33b in their longitudinal directions are substantially overlapped with the centerlines of the electrode layers 31b, 31c, 32b and 32c in their longitudinal directions, and the strip-like portion 31ax of the positive electrode 31 is positioned in the opposite side of the strip-like portion 32ax of the negative electrode 32 with respect to the above center lines in their width directions.

By winding as such, the separators 33a and 33b perfectly break the positive electrode layers 31b and 31c from the negative electrode layers 32b and 32c, whereby the positive electrode layers 31b and 31c and the negative electrode layers 32b and 32c are electrically insulated when these are assembled as the winding element 50.

As described, the winding element 50 is constructed by winding a laminate obtained by piling the separator 33a, the positive electrode 31, the separator 33b, and the negative electrode 32 in this order. A core 40 having an outer diameter D2 is wrapped in a center of the winding element 50. In an actual application, the winding element is formed by winding the above laminated sheet so that the separator 33a is positioned in the innermost periphery around the core 40. The order may be the core 40, the separator 33a, the negative electrode 32, the separator 33b, and the positive electrode 31 from the inner side.

The core 40 is in a hollow cylindrical shape having a hollow portion 44 as a hollow cavity in the present invention. The core 40 has an upper end 45, in which an inflow port 38 for the electrolyte is formed, and a lower end 46, in which an outflow port 39 is formed. Although the upper end 45 is positioned lower than a lower side 31d of the strip-like portion 31ax (a long side of the strip-like portion 31ax on the side of the winding element 50) in FIG. 1, it is not limited to the lower position. Further, although the upper end 45 is positioned higher than an upper side 32e of the strip-like portion 32ax (a long side of the strip-like portion 32ax on the side of the winding element 50), it is not limited to the higher position.

Further, although the separator 33a is wound in the innermost periphery, the positive electrode 31 is wound around the outside thereof, the separator 33b is wound in the outermost periphery, and the positive electrode 31 is wound around the inside thereof in FIG. 9, the separator 33a may be in the outermost periphery and the negative electrode 32 may be inside thereof.

The basic structure of the winding element 50 is, in other words, a pair of electrodes, i.e. the strip-like positive electrode 31 and the strip-like negative electrode 32, are mutually shifted in the up and down directions so that the respective electrode layers are overlapped, and the separators 33a and 33b are interposed between the electrodes and wound so as to be a cylindrical shape. The positive pole is the strip-like portion 31ax as a crushing part protruding in the axial direction of the winding element 50 from the upper portion. The negative pole is the strip-like portion 32ax as a crushing part protruding in the axial direction of the winding element 50 from the lower portion. The strip-like portions are wound so as to be in the cylindrical shape.

The positive collector plate 72 as the first collector plate is positioned on the upper side of the winding element 50. And the negative collector plate 73 as the second collector plate is positioned on the lower side of the winding element 50. An aperture 69 having a diameter of D3 is processed in a center portion of the positive collector plate 72, and an aperture 78 having a diameter of D2 is machined in a center portion of the negative collector plate 73. The strip-like portions 31ax and 32ax respectively protrude up and down in the upper end portion and the lower end portion of the winding element 50 as crushing parts, to be crushed toward the axis of the winding element 50, are respectively pressed on the positive collector plate 72 and the negative collector plate 73 so as to be crashed by predetermined amounts and connected by welding (i.e. ultrasonic welding, laser welding, electron-beam welding, hereinbelow, the welding is used in a similar manner thereto). The positive collector plate 72 and the negative collector plate 73 are arranged substantially in perpendicular to the core 40.

A negative outer terminal 92 having an outer diameter of D1 as a cylindrical second terminal having a recess 88 having a diameter of D2 in a circular cross-sectional shape is engaged with and fixed by welding to a bottom aperture 52, machined in a bottom portion 62 of the case 60. It is possible to weld from the outside of the case 60. A lower surface 87 of the negative outer terminal 92 is flush with the outer side surface of the bottom portion 62. It is possible to electrically connecting the negative outer terminal 92 to the outside. The lower surface 87 of the negative outer terminal 92 may protrude from the bottom portion 62. The negative collector plate 73 as the second collector plate having a shape substantially the same as that of the positive collector plate 72 is welded to and attached to the upper surface 86 of the negative outer terminal 92.

The core 40 having the outer diameter D2 does not penetrate through the aperture 78 of the diameter D2 in the negative collector plate 73, is not engaged with the recess 88 having the inner diameter D2, and is not in contact with the negative outer terminal 92. The negative outer terminal 92 is not required to fix the winding element 50 by being in contact with the core 40.

The structure may be such that the core 40 penetrates through the aperture 78 having the diameter D2 in the negative collector plate 73, is engaged with the recess 88 having the inner diameter D2, and is in contact with the negative outer terminal 92. A cave hole 89 is machined in the recess 88 so that the cave hole 89 positions inside the case 60, wherein a lower end 46 of the core 40 is positioned upper than the cave hole 89. Accordingly, the electrolyte is supplied from the hollow portion 44 of the core 40 through the cave hole 89.

In the upper end 45 of the core 40, a positive outer terminal 91 as the first terminal in a substantially hollow cylindrical shape having a hollow portion 94 as a hollow flow path, characterizing the present invention, is mounted so that the central axis line of the positive outer terminal 91 is substantially in agreement with the central axis line of the core 40, and the hollow portion 94 is connected to the hollow portion 44 of the core 40. The positive outer terminal 91 passes through a hollow portion 31f formed in a center portion of the strip-like portion 31ax, penetrates through the aperture 69 of the positive collector plate 72 and the upper aperture 53 of the sealing lid 63, and protrudes from the sealing lid 63 at its tip end 14. Accordingly, the positive outer terminal 91 can be electrically connected to an outside. The outer diameter of the penetrating portion of the positive outer terminal 91 penetrating through the positive collector plate 72 is D3, and the outer diameter of the penetrating portion of the positive outer electrode 91 penetrating through the sealing lid 63 is D4. The positive outer terminal 91 is not in contact with the core 40. This is because the positive outer terminal 91 is not required to fix the winding element 50 by being in contact with the core 40.

As described, since the tip end 84 of the positive outer terminal 91 protrudes from the sealing lid 63, and the lower surface 87 of the negative outer terminal 92 is flush with the bottom portion 62, a serial connection of the electrochemical devices 11 becomes possible. Further, since the positive outer terminal 91 has the cave hole 93 connected to the hollow portion 94, and the cave hole 93 is positioned higher than the positive collector plate 72, the electrolyte can be supplied from the hollow portion 94 through the cave hole 93. An upper opening portion 95 in the positive outer terminal 91 as an inlet of the electrolyte is used to charge the electrolyte to the hollow portion 94 and ordinarily clogged by a lid 96. A safety valve (not shown) may be attached to the lid 96. In this case, even though a gas is generated inside the case 60, the gas is released from the safety valve. Although the inlet of the electrolyte is formed in an upper portion in FIG. 1, it may be formed in a lower portion.

As described, the strip-like portion 31ax of the positive electrodes 31 and the strip-like portion 32ax of the negative electrodes 32 are wound so as to respectively position on opposite end surfaces of the cylindrical winding element 50 (the upper end and the lower end in the figure). The upper end 45 of the core 40 is not in contact with the strip-like portion 31ax and the positive outer terminal 91, and the lower end 46 is not in contact with the strip-like portion 32ax and the negative outer terminal 92. Therefore, the positive collector plate 72 is not electrically connected to the negative collector plate 73 through the core 40. If the core 40 is in contact with the strip-like portion 31ax and the positive outer terminal 91, the core 40 and the neighborhood thereof including the contact portion is made of an insulating member. If the core 40 is in contact with the strip-like portion 32ax and the negative outer terminal 92, the core 40 and the neighborhood thereof including the contact portion is made of an insulating member, whereby the positive collector plate 72 is not electrically in contact with the negative collector plate 73 through the core 40.

Figure 5:
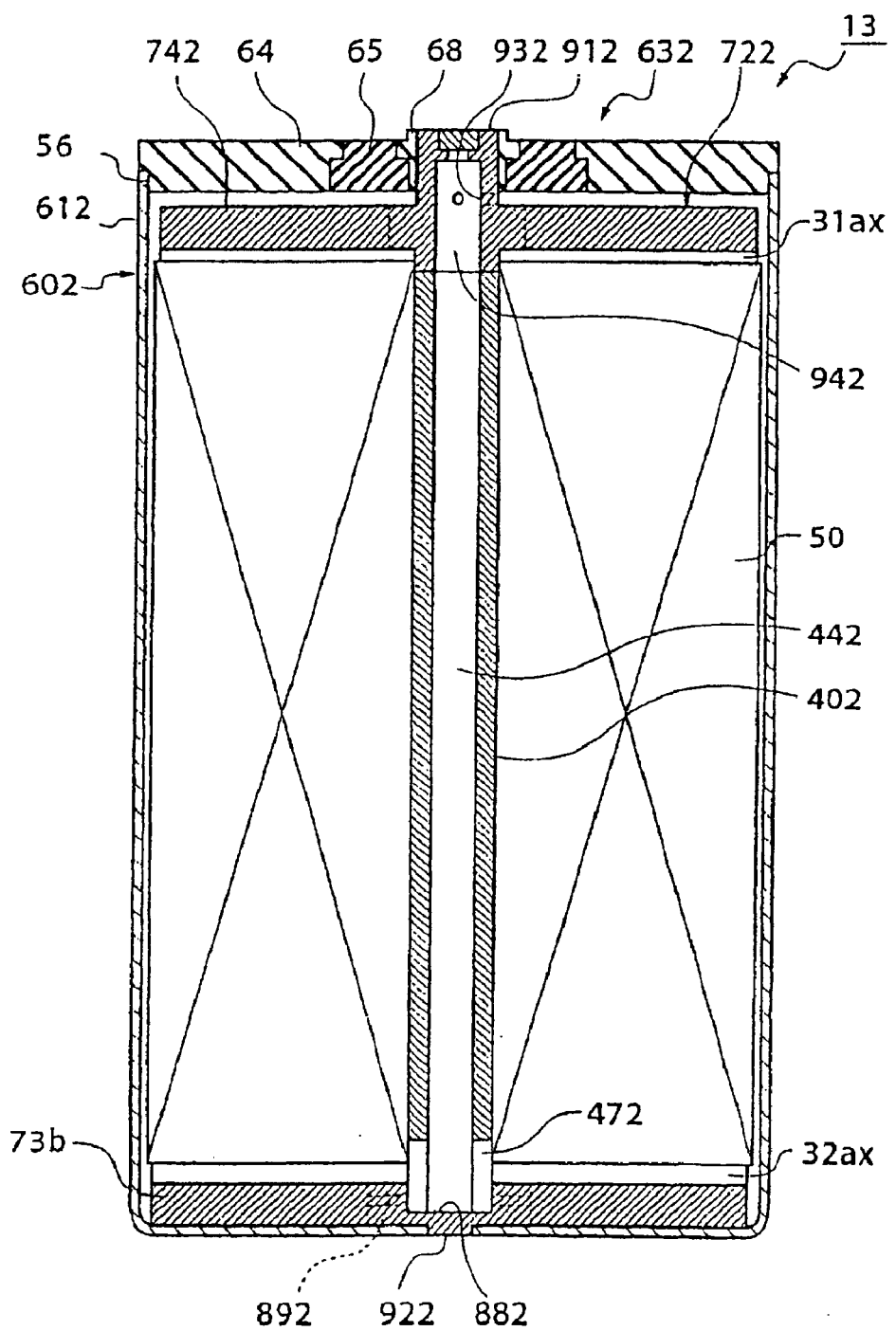
FIG. 5: A schematical cross-sectional view of an electrochemical device according to Embodiment 2 of the present invention

The aperture 53 in the center portion of the sealing lid 63 is shaped to have a step, wherein the diameter of a lower side portion 55 of the aperture 53 is larger than the diameter D4 of an outer side portion 54 of the aperture 53. Further, the diameter of the positive outer terminal 91 is D4, and the tip end is engaged with the upper side portion 54 of the aperture 53 and protrudes therefrom. For example, when the end portion of the opening portion of the case 60 is caulked without forming a bead in the case 60 as illustrated in FIG. 5, it is preferable that the aperture in the central portion of the sealing lid 63 is in a shape having a step. However, in the case of FIG. 1, it is not specifically necessary to form a step.

Figure 2A:
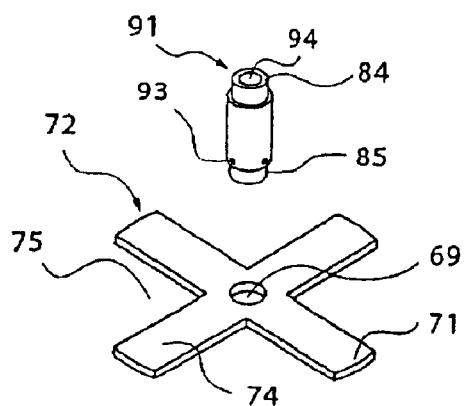
FIG. 2: Exploded views explaining assembling of a positive collector plate, a positive outer terminal, and a sealing lid
Figure 2B:
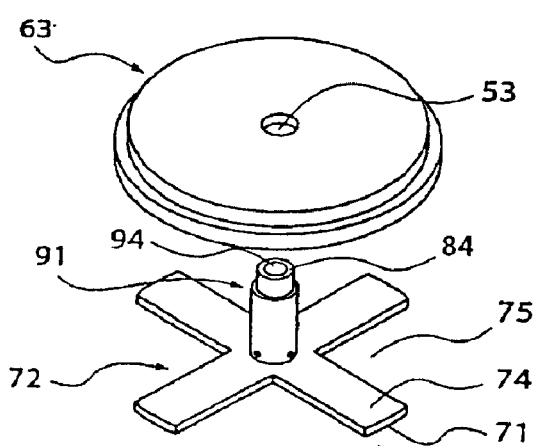

The outer diameter of the positive collector plate 72 is a bit smaller than the inner diameter of the case 60, and a single or plurality of packing 83 is interposed between a gap between the positive collector plate 72 and the case 60 to electrically insulating beads, wherein the packing 83 has the thickness of about a half of the difference between the outer diameter and the inner diameter, is made from a insulating material having an L-like shape in cross section, and located in a tip end portion 71 of a ledge in a crisscross shape in the positive collector plate 72, specifically illustrated in FIGS. 2(a) and 2(b).

In a similar manner thereto, the outer diameter of the sealing lid 63 in a disk-like shape is formed a bit smaller than the inner diameter of the case 60, and a packing 82 in a ring-like shape is interposed in a gap between the sealing lid 63 and the case 60 to electrically insulating these, wherein the packing 82 has the thickness substantially a half of a difference between the outer diameter and the inner diameter and is made from an insulating material having an L-like shape in cross section. Further, a rectangular ring 81 having a cross-sectional shape of rectangular as a sealing member is located above the packing 82 and in an upper portion of the inner peripheral side surface of the case 60.

The end portion 61 forming the opening portion and located on the side opposite to the bottom portion 62 of the case 60 is inwardly convoluted toward the sealing lid to cover the rectangular ring 81, whereby the end portion is 61 of the case 60 and the rectangular ring 81 are sealed. Further, the structure that the end portion 61 pushes down the sealing lid 63 through the rectangular ring 81 is adopted.

The case 60 has a structure that the outer periphery of the case 60 is inwardly choked at a position slightly above the positive collector plate 72 to form the bead 76 in order to push the collector plate 72 in the direction of the bottom portion 62 through the packing 83.

Next, a method of assembling the electrochemical device 11 illustrated in FIG. 1 according to this embodiment will be described.

Figure 2C:
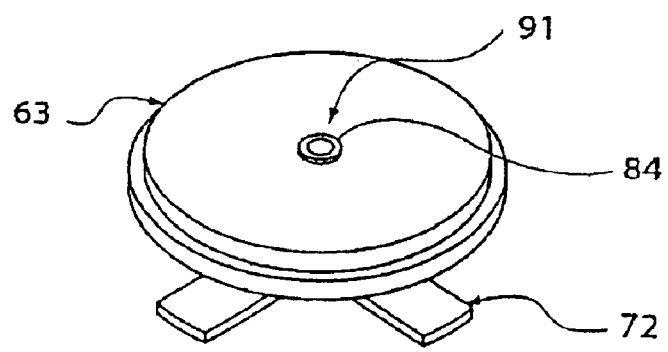

As illustrated in FIGS. 2(a) and 2(b), a cylindrical lower portion 85 of the positive outer terminal 91 substantially shaped like a cylinder is inserted in a circular aperture 69 opened in a center portion of the positive collector plate 72 shaped like a crisscross, and the surface of the positive collector plate 72 is welded to an edge of the side surface of the cylindrical portion of the positive outer terminal 91 protruding from the surface being in contact with the surface. The positive collector plate 72 may be integrally formed with the positive outer terminal 91. Thus assembled assembly is referred to as an upper assembly. Assembling of the sealing lid 63 with the positive outer terminal 91 illustrated in FIG. 2(c) is not conducted yet at this stage.

Next, as illustrated in FIG. 3(a), the negative collector plate 73 in a crisscross shape having a circular aperture 78 is welded to an upper surface 86 of the negative outer terminal 92 in a disk-like shape having the circular recess 88. At this time, central axes of the recess 88 and the aperture 78 are in agreement. Thus assembled assembly is referred to as a lower assembly.

Next, as illustrated in FIG. 3(b), the negative outer terminal 92 is inserted in the circular bottom aperture 52 of the circular bottom portion 62 of the case 60, and welded so that the lower surface 87 of the negative outer terminal 92 is flush with the outer side surface of the bottom portion 62. However, these assembling and welding will be conducted in a later process and is not conducted at this stage.

FIG. 3(b) is a view of FIG. 3(a) observed in a direction of an arrow a.

Figure 4B:
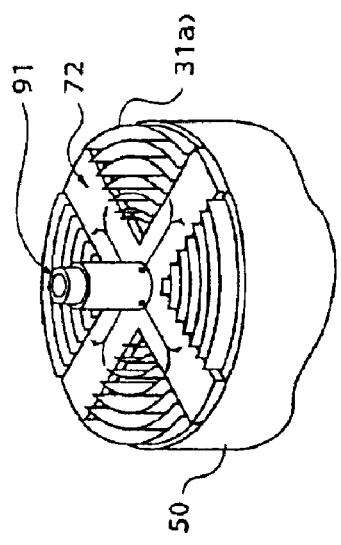
FIG. 4: Schematical views for explaining attachment of a positive collector plate to a winding element
Figure 4D:
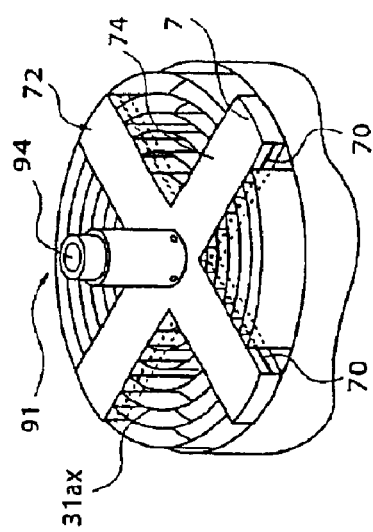
Figure 4A:
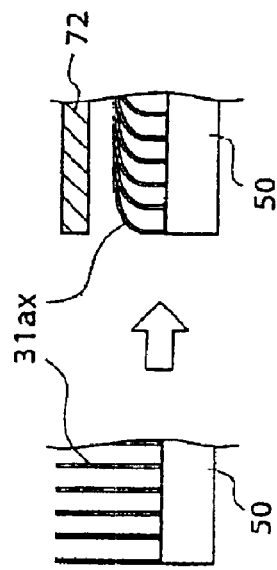

Next, assembling among the upper assembly, the winding element 50, and the lower assembly will be described in reference of FIG. 4. Although the upper assembly and the winding element 50 are shown in the figure, the following explanation about the figure is applicable to the winding element 50 and the lower assembly. The assembling is welding between the strip-like portion 31ax of the winding element 50 and the positive collector plate 72 shown in FIG. 4(a) and welding between the strip-like portion 32ax and the negative collector plate 73. The contact portion between the strip-like portion 31ax and the positive collector plate 72 is crushed toward the axis of the winding element 50 as illustrated in FIG. 4(a), and the positive collector plate 72 is mounted on the crushed portion and welded as illustrated in FIG. 4(b).

Figure 4C:
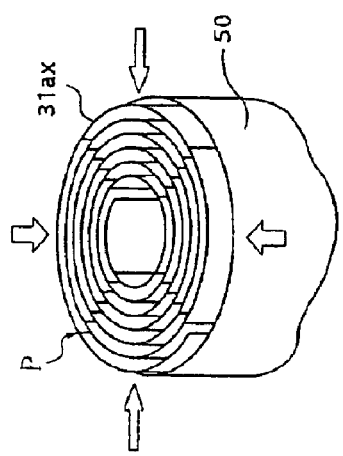

It is preferable to partially cut, for example, a portion p of the strip-like portion 31ax as illustrated in FIG. 4(c) because the strip-like portion 31ax is easily crushed by the positive collector plate 72 to widen a welding portion. It is preferable that the strip-like portion 31ax is partially crushed to keep a flow path of the electrolyte because a substantial time is required to inject the electrolyte to the winding element if the entire strip-like portion 31ax is crushed. It is preferable to adopt similar structures to welding the strip-like portion 32ax with the negative collector plate 73.

In the case of the positive collector plate 72, a preferable structure for supplying the electrolyte will be described in reference of FIG. 4(d). Flow paths are formed on side surfaces of the ledges 74 in a shape of crisscross in the collector plate 72. The flow paths 70 are connected to the cave holes (not shown in FIG. 4(d)) connected to the hollow portion 94 of the positive outer terminal 91. In this structure, it is possible to supply the electrolyte supplied to the hollow portion 94 of the positive outer terminal 91 to the winding element 50 within a short time. Even though the cave holes are formed to connect the hollow portion 94 without forming the flow paths 70, the electrolyte is supplied within a rather short time. However, even though the cave holes are formed, in a structure of clogging the cave holes, the above-described flow paths 70 are useful.

As described, the assembly of the upper assembly, the winding element 50, and the lower assembly is referred to as an inner assembly. Next, the inner assembly is inserted in the case 60 placed downwardly directing the bottom portion 62 in a state that the negative collector plate 73 is downwardly directed.

Next, the explanation will be given in reference of FIG. 1. The packing 83 is brought into contact with the tip portion 71 of the ledges 74 in the crisscross shape of the positive collector plate 72 and the packing 82 is brought into contact with the lower portion of the outer periphery of the sealing lid 63 before inserting the inner assembly described above. When the lower surface 87 of the negative outer terminal 92 is in flush with the outer side surface of the bottom portion 62 of the case 60, it is stopped to insert the inner assembly, and the negative outer terminal 92 is welded to the case 60 as illustrated in FIG. 3(b), which step has been described above.

Next, the bead 76 is processed in a part of the case 60 corresponding to a position between the packing 82 and the packing 83. As illustrated in FIG. 2(c), the tip portion 84 of the positive outer terminal 91 is inserted in the circular upper aperture 53 formed in the center of the sealing lid 63 formed to be the disk-like shape, and the surface of the sealing lid 63, the side surface of the tip portion 84 protruding from the surface, and the edge of the tip portion 84 being in contact with the surface are welded. Next, as illustrated in FIG. 1, the rectangular ring 81 is engaged with an upper portion of the outer periphery of the sealing lid 63, and the top end 61 being the opening portion of the case 60 is caulked.

As described, the case 60 and the negative outer terminal 92, the negative outer terminal 92 and the negative collector plate 73, the negative collector plate 73 and the strip-like portion 32ax of the winding element 50, the strip-like portion 31ax of the winding element 50 and the positive collector plate 72, the positive collector plate 72 and the positive outer terminal 91, and the positive outer terminal 91 and the sealing lid 63 are respectively welded, and the end 61 of the case 60 is inwardly bent, whereby it is possible to firmly assemble the electrochemical device 11.

Further, by making the negative outer terminal 92, the negative collector plate 73, and the negative electrode 32 from an identical material, making the positive outer electrode 91, the positive collector plate 72, and the positive electrode 31 from an identical material, and joining by laser welding, ultrasonic welding, electron-beam welding or the like, it is possible to reduce the inner electrical resistance of the electrochemical device 11.

Accordingly, because the crushing amounts of the strip-like portions 31ax and 32ax toward the axis of the winding element 50 can be set to be a desirable value, and the positive collector plate 72, the negative collector plate 73, and the winding element 50 are securely in contact, it is possible to prevent variation of the electric resistance in use. Further, since the strip-like portion 31ax and the positive collector plate 72, and the strip-like portion 32ax and the negative collector plate 73 are respectively connected by welding, it is possible to restrict variation of the electric resistance with respect to a long-term vibration.

By constructing as described above, a kind of property of lead-less (tab-less) is obtainable in comparison with conventional methods using leads, whereby it is possible to remove a space occupied by a lead portion, and improve a rate of filling electrode inside an element. Further, because it is possible to collect electricity from the whole collector plate, of which area is wide, it is possible to restrict an electrical internal resistance, whereby it is possible to deal with high output.

In order to inject the electrolyte to the assembly of the electrochemical device 11 constructed as described above, the electrolyte is injected after opening the lid 96 of the upper opening portion 95 of the positive outer terminal 91. A part of the electrolyte passes through the cave hole 93 of the positive outer terminal 91, escapes to the outside of the positive outer terminal 91, and flows the surface of the upper portion of the ledge 74 of the positive collector plate 72. In order to assure the capability of injecting the electrolyte, i.e. sufficient quantity and reduction of a time for injecting the electrolyte, cutouts 75 in FIG. 2 and cutouts 79 in FIG. 3 are respectively provided four positions of the positive collector plate 72 and the negative collector plate 73 so as to be a crisscross shape. The electrolyte is supplied to the winding element 50 through the cutouts 75.

The other part of the electrolyte passes through the inflow port 38 in the upper end 45 of the core 40, enters into the hollow portion 44, and escapes to the outside of the core 40 from the outflow port 39 in the lower end 46. The electrolyte escaped to the outside of the core passes through a space in a lower portion of the ledge 59 of the negative collector plate 73, specifically illustrated in FIG. 3(a), upwardly passes through the cutouts 79, and is supplied to the winding element 50. A plurality of apertures may be opened in the positive collector plate 72 and the negative collector plate 73 at positions where the electrodes are not crushed so that the electrolyte passes through the apertures of the both of the collector plates 72 and 73.

As described, the hollow portion 94 and the cave hole 93 are provided in the positive outer electrode 91, the hollow portion 44, the inflow ports 38, and the outflow port 39 are provided in the core 40, and the cave hole 89 is provided in the recess 88. Accordingly, the electrolyte injected from the upper opening portion 95 as an injection port to the hollow portion 94 is injected through the cutouts 75 of the positive collector plate 72 (in the case that the above-mentioned apertures are formed instead of the cutouts, through the apertures) from the cave hole 93, or is injected from the hollow portion 44 through the inlet port 38, the outlet port 39, the cave hole 89 of the recess 92, and the cutouts 79 of the negative collector plate 73 (in the case that the above-mentioned apertures are formed instead of the cutouts, through these apertures), and reaches the winding element 50, whereby impregnation to the winding element 50 is assured. Although the winding element 50 is impregnated with the electrolyte after it is accommodated in the case 60, the winding element 50 may be impregnated with the electrolyte in advance and accommodated in the case 60.

In reference of FIG. 5, an electrochemical device 12 according to Embodiment 2 of the present invention will be described.

The major difference of the electrochemical device 12 according to Embodiment 2 from that of Embodiment 1 is that the bead 76 shown in FIG. 1 is not formed in a case 601. Further, although a positive collector plate 721 has apertures 691 in the same manner, another difference is that a flow path 70 is provided so as to be connected with a cave hole 931 of a positive outer terminal 91, and the flow path is machined in each side surface of the ledges 741 in the crisscross shape.

Further, in this embodiment, a portion of the strip-like portion 31ax which is not crushed by the positive collector plate 721 is constructed so as not to outward protrude from the positive collector plate 721 toward the axis of winding element 50. An insulating member 821 such as an insulating tape is positioned on tip portions 711 of the ledges 741 in the crisscross shape of the positive collector plate 721 so as to be positioned in the lower side of the outer peripheral side surface of a sealing lid 63. The insulating member 821 insulates the positive collector plate 721 from the case 601 and the strip-like portion 31ax from the case 601.

A negative collector plate 73, a negative outer terminal 92, a strip-like portion 32ax, and so on are similarly constructed as illustrated in FIG. 1. However, because a core 401 receives counterforce caused at a time of caulking an end portion 611 of the case 601, the core 401 is engaged with a recess 88 so as to be in contact with the negative outer terminal at a bottom surface 90 of the recess. Portions of the core 401 in contact with the strip-like portion 32ax and the negative outer terminal 92 are made from an insulating material.

By constructing as such, because the tab-less feature is obtainable and a longitudinal space required for forming a bead can be omitted, whereby it is possible to increase the volume density per unit volume. Sealing of the case 601 is assured by a contact between the tip portion 611, being a convoluting portion on the upper end of case 601 and a rectangular ring 81.

Further, the positive outer terminal 91, the sealing lid 63, the positive collector 721, the core 401, the negative collector plate 73, the negative outer terminal 93, and the case 601 are integrally formed to demonstrate sufficient rigidity by being in contact as an assembly or joined by for example a bond. Accordingly, even though a bead as a fixing means is not provided, the assembly can be securely fixed to the case 601. Since the bead is omitted, the production becomes easy and a production equipment can be simplified.

Since the positive collector plate 721 and the strip-like portion 31ax, and the negative collector plate 73 and the strip-like portion 32ax are welded, it is possible to secure the contact and obtain stability between the collector plates and the strip-like portions. Vibration proof is also improved. Further, by joining the positive collector plate 721 to the strip-like portion 31ax and the negative collector plate 73 to the strip-like portion 32ax, it is possible to restrict long-term variation of electric resistance.

Figure 6:
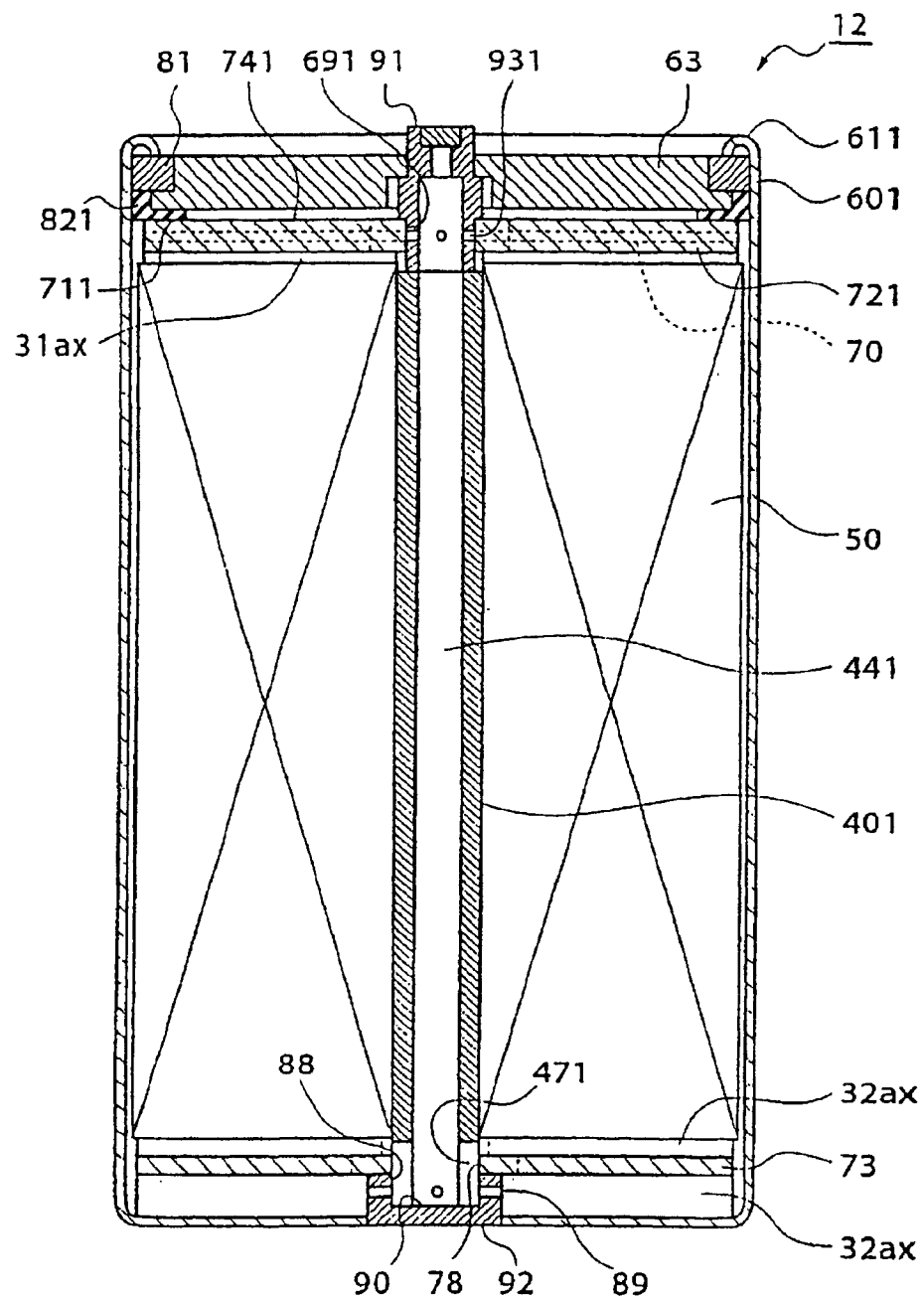
FIG. 6: A schematical cross-sectional view of an electrochemical device according to Embodiment 3 of the present invention

In reference of FIG. 6, an electrochemical device 13 according to Embodiment 3 will be described.

The major difference of the electrochemical device 13 according to this embodiment from that of Embodiment 1 is that the bead 76 shown in FIG. 1 is not formed in a case 602, and a sealing lid 632 is separated to a terminal portion 68 joined to a positive outer terminal 912 through an insulating member 65 and a portion 64 joining to the case 602. The terminal portion 68 and the positive outer terminal 912, and the positive outer terminal 912 and a positive collector plate 722 are respectively joined by for example welding, and the portion 64 joining to the case 602 is separated there from interposing the insulating member 65. It is also different from Embodiment 1 that a part of a strip-like portion 31ax in this embodiment, which is not crushed by the positive collector plate 722, and a part of a strip-like portion 32ax, which is not crushed by a negative collector plate 732, are constructed so as not to protrude respectively from the positive collector plate 722 and the negative collector plate 732 toward an axis of winding element 50 (on outer sides in the axis direction of the case 602).

As described, the positive collector plate 722 is integrally formed with the positive outer electrode 912, has a hollow portion 942, and has a cave hole 932 formed in a portion upwardly corresponding to ledges 742 in a cross shape of the positive collector plate 782. A step 56 on the outer peripheral side surface of the portion 64 is welded to an end portion 612 of the case 602.

Further, the negative collector plate 732 is integrally formed with a negative outer terminal 922. A recess 822 is formed on an upper surface of a part corresponding to the negative outer terminal 922, wherein a core 402 is engaged with the recess 822. A cutout 472 is formed in the core 402 to assure a flow path of an electrolyte. A cave hole may be formed at a position in contact with the strip-like portion 32ax of the core 402.

Figure 7:
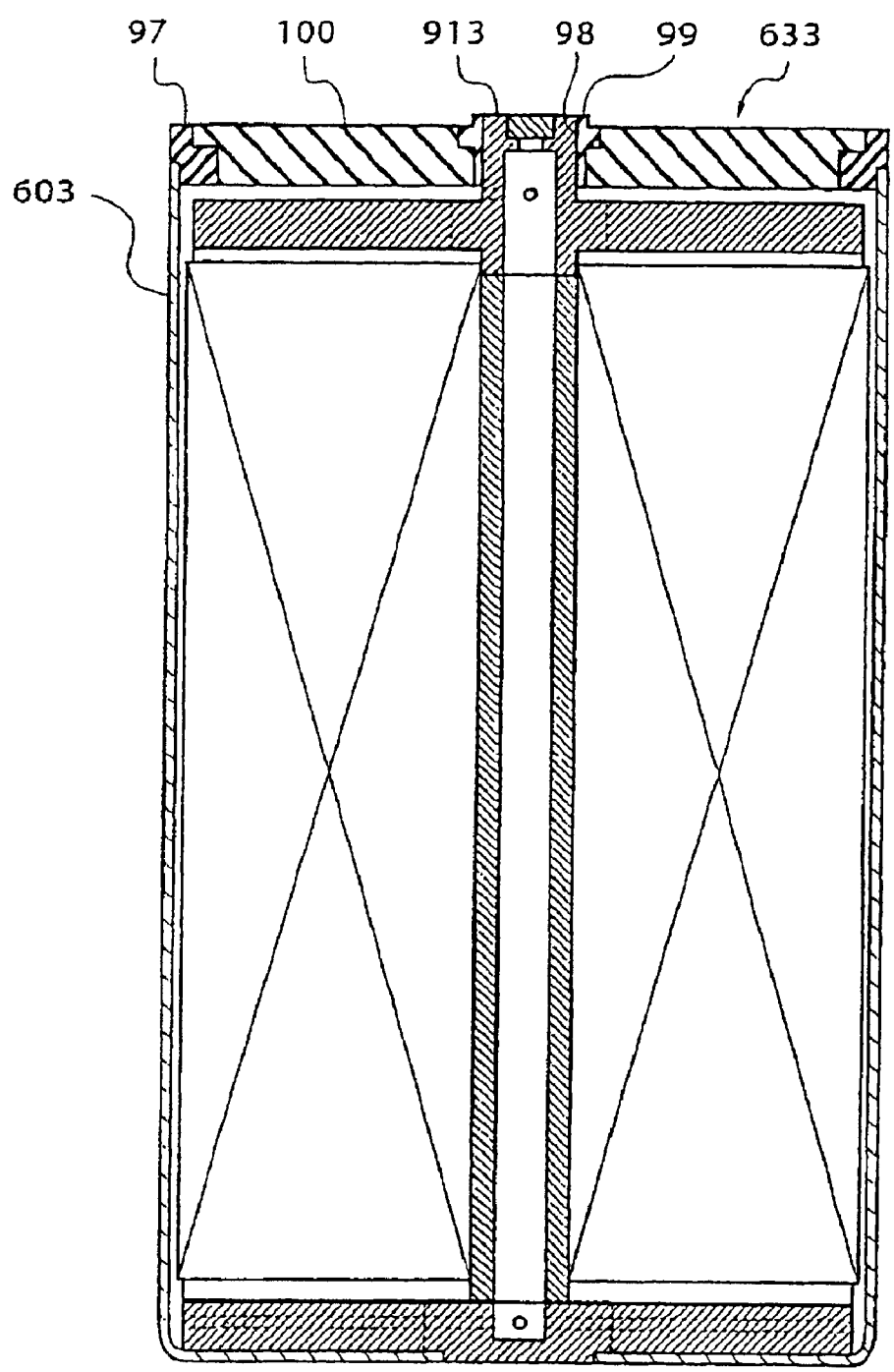
FIG. 7: A schematical cross-sectional view for showing another embodiment of a structure of a positive collector plate, a positive outer terminal, and a sealing lid

As illustrated in FIG. 7, a sealing lid 633 has a structure that an outer ring 97 made from a metallic material the same as that of the case 603 and an inner ring 99 having a hollow portion 98 and made from a metallic material the same as that of the positive outer electrode 913 are included. A material of a sealing lid body embedded between the outer ring 97 and the inner ring 99 may be insulating member such as a resin. In this case, the outer ring 97 and the case 603, and the inner ring 99 and the positive outer terminal 913 are welded. Further, the structure is that the outer ring 97 is not relayed to and in contact with the positive outer terminal 913.

In reference of FIG. 5, a structure of core according to Embodiment 2 will be specifically described. The core 401 is a cylindrical column-like member as a whole. A lower portion of the core 401 is made from an insulating material such as plastic, and the other portion is made from a metal such as aluminum. The upper portion and the lower portion are integrally fixed by tapping, welding, and so on. Since the lower portion is made from the insulating material, the negative collector plate 73 in contact with the lower portion is not electrically connected to the positive collector plate 721 in contact with the upper portion. Further, even though the entire core 401 is formed by a metal, any one of a combination of the positive collector plate 721 and the core 401 and a combination of the negative collector plate 73 and the core 401 may be in contact via an insulating material or are not in contact so as not to be electrically connected.

The hollow portion 441 described above is formed in the core 401, and a cave hole 89 is machined in the recess 88 of the negative outer terminal 92, whereby the electrolyte is supplied not only through the cave hole of the positive outer terminal 931 but also through the cave hole 89, whereby the electrolyte can be injected within a substantially short time.

The material of the hollow core 40 used in the embodiment preferably has corrosion resistance against an electrolyte and a large mechanical strength. The material may be a resin such as fluorocarbon resin like polyethylene, polypropylene, urea resin, polyacetal, poly(meta)acrylate, nylon resin, polyimide, polyurethane, polytetrafluoroethylene, polyfluoro vinylidene, preferably a metal such as aluminum, aluminum alloy, cast iron, stainless steel, copper, nickel, titanium, tantalum, monel, and hastelloy, more preferably a light aluminum.

Figure 10:
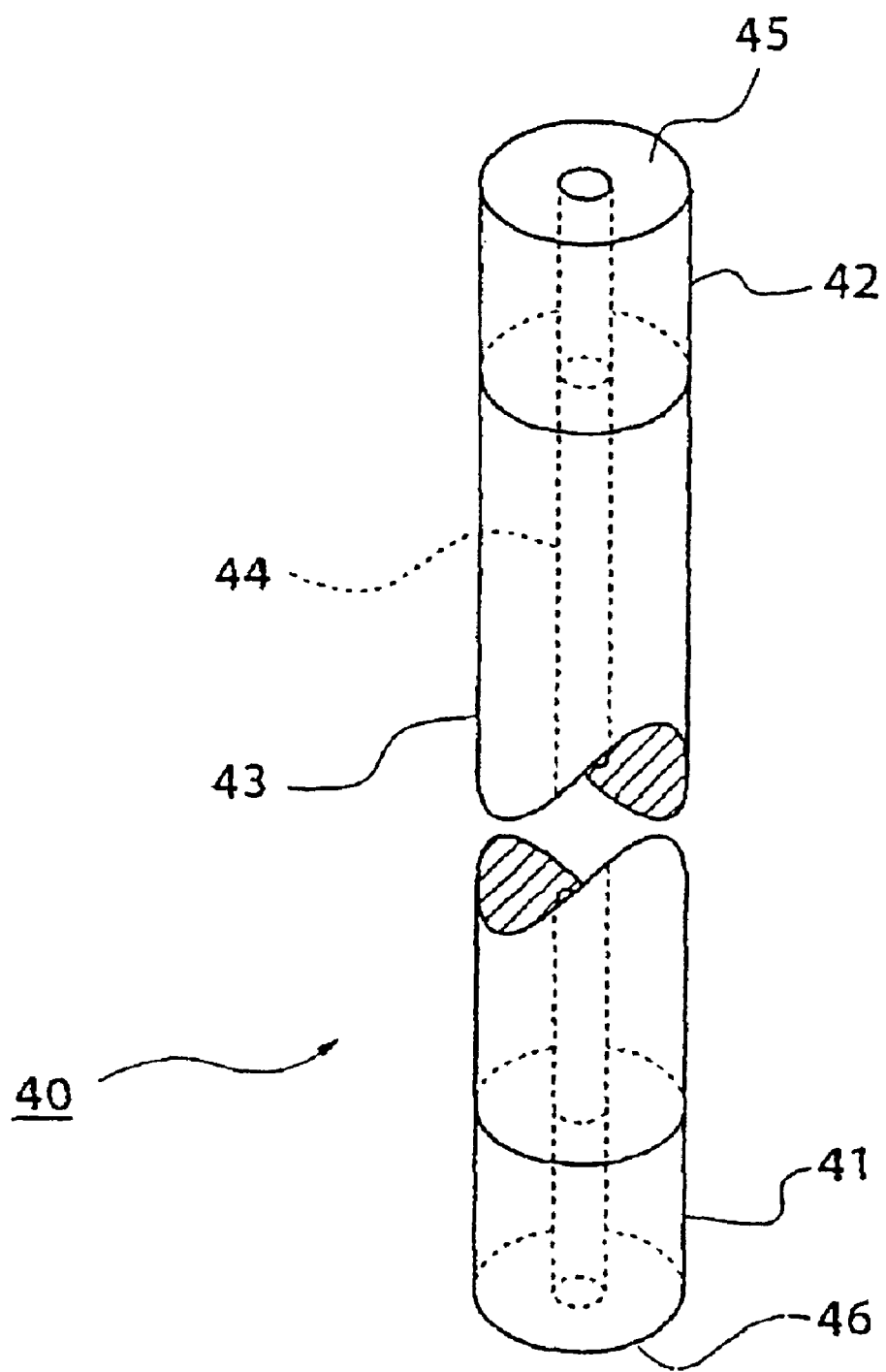
FIG. 10: A perspective view illustrating a preferable example of a core used in an embodiment of the present invention
Figure 11:
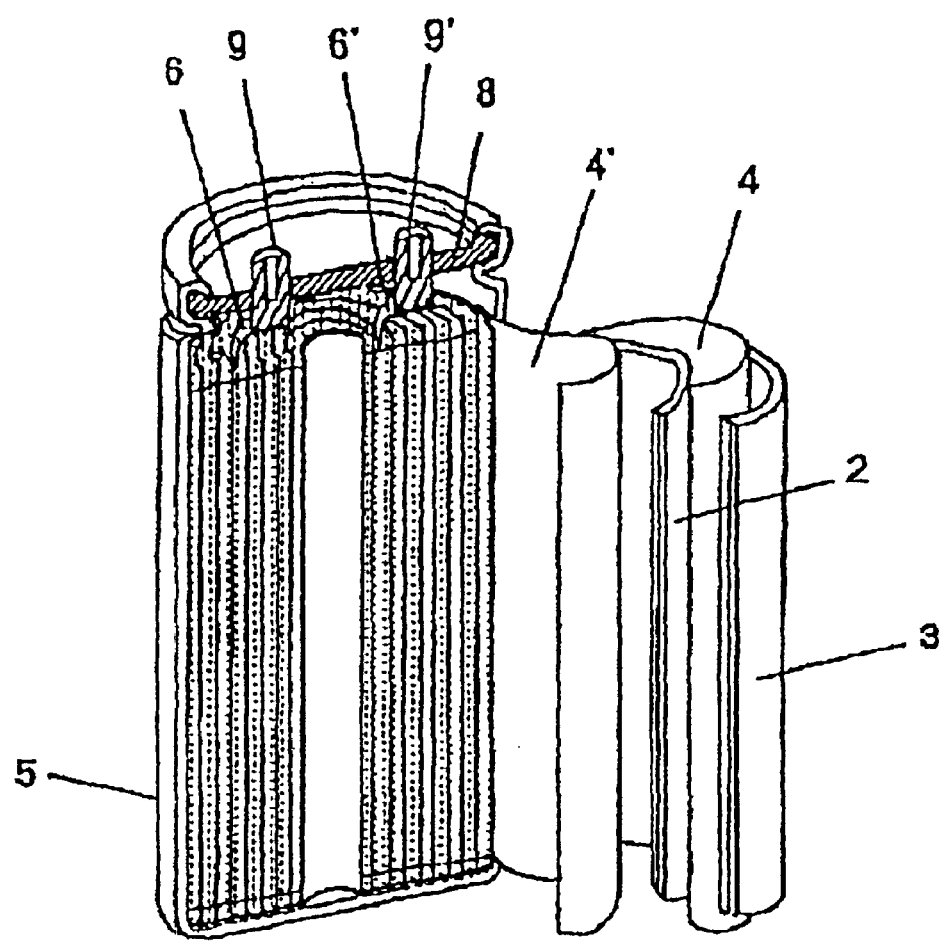
FIG. 11: A perspective cross-sectional view illustrating a structure of the conventional secondary battery

For example, when the core 40 having the hollow portion 44 is completely made of a conductor as illustrated in FIG. 10, the upper portion 42 of the core 40 is in electrically connected to the positive electrode 31 (not shown in FIG. 10) of the winding element 50 (not shown in FIG. 10), and the lower portion 41 of the core 40 is electrically connected to the negative electrode 32 (not shown in FIG. 10) and the negative outer terminal 92 (not shown in FIG. 10) located in the bottom portion 62 (not shown in FIG. 10) of the metallic case 60 (not shown in FIG. 10). Accordingly, in order to securely prevent electrical short, the core 40 is separated to the upper portion 42 and the lower portion 41, and these portions may be joined so as to insulate each other using a middle portion 43 of the core as an insulating joint made from an insulating material. In this case, the upper portion 42, the lower portion 41 and the insulating joint 43 respectively have hollow portions, and the hollow portions are connected to form the hollow portion 44.

Further, in order to prevent electrical connection caused by a contact of the core 40 with the strip-like portion 31ax or 32ax (see FIG. 1), the core 40 may be covered by a separator material as an insulating material, or the length of the core 40 may be adjusted so as not to be in contact with the separator materials 31ax and 32ax.

It is preferable that the upper portion 42 of the core and the insulating joint 43, and the lower portion 41 of the core and the insulating joint 43 are respectively firmly joined by tapping and/or fitting. The insulating joint 43 is preferably a resin with high strength and excellent heat resistance, for example, a polyimide resin, polyparaphenylene sulfide, and so on is preferable. As described, when the upper portion 42 and the lower portion 41 of the core 40 are made from a metal, it is possible to apply a large rotational driving force to the core 40 at a time of winding.

In a case that the core 40 including the metallic portion is used, a separator 33a (not shown in FIG. 10) is arranged in the innermost periphery of the winding element 50 (not shown in FIG. 10) while winding. Further, it is preferable to form the winding element 50 by winding the strip-like electrodes 31 and 32 (not shown in FIG. 10) via separators 33a and 33b so that the separator 33a or 33b (not shown in FIG. 10) is arranged in the outermost periphery of the winding element 50.

Further, as illustrated in FIG. 1, when the positive outer terminal 91 arranged in the upper portion of the core 40 has the hollow portion 94 and the hollow portion 94 is connected to the hollow portion 44, the cave hole 93 for supplying an electrolyte may be formed in the positive outer terminal 91. Further, when the core penetrates the aperture 78 of the negative collector plate 73 on the side of negative pole and inserted in the recess 88 of the negative outer terminal 92, and the cutouts 471 are formed in a part of the core 401 inserted in the recess 88, the cave hole 89 for supplying the electrolyte may be formed in the negative outer terminal 92.

In reference of FIG. 1, in the case of Embodiment 1, preferable materials of major components, which have not been described, will be described. The collectors 31a and 32a may be a conductor having electrochemical or chemical corrosion resistance, wherein black lead, corrosion resistant metal, and so on may be used. Especially, when an non-aqueous electrolyte is used, a metallic foil such as aluminum, stainless steel, titanium steel, tantalum, and the like may be preferably used. In the present invention, it is preferable that the collectors 31a and 32a are made of a metallic foil and the thickness is about between 10 $\mu$m to 0.5 mm. Further, it is preferable that the surface is roughened because the contact between the electrode layers 31b, 31c, 32b, 32c and the collectors 31a and 32a.

The materials of the positive collector plate 72 and the negative collector plate 73 may respectively be the materials of the positive collector 31a and the negative collector 32a, preferably, for example, aluminum, aluminum alloy, stainless steel, titanium, tantalum, hastelloy, or stainless steel.

The shapes of the collector plate 72 and 73 are not specifically limited. For example, it may be a disk plate with rigidity, on which a disk-like thin foil is adhered thereto or a disk plate having rigidity made of the above-mentioned material. Further, it is not limited to a disk, and it is preferable to use a polygonal plate, that with a plurality of holes, that with a plurality of cutouts in the periphery thereof, and typically a in a crisscross shape. An electrolyte can be injected from the cutouts (these can be holes), the winding element 50 can be impregnated in the electrolyte, and a gas can be rejected from the inside at a time of injecting the electrolyte.

Next, the electrode layer, the separator, the electrolyte, and so on will be described in a case that the electrochemical device according to the present invention is an electric double layer capacitor.

On both sides of the positive collector 31a and the negative collector 32a, the positive electrode layers 31b and 31c and the negative electrode layers 32b and 32c are respectively formed. These electrode layers contain a carbon material having a large surface area/weight ratio of about from 800 to 3500 m$^2$/g such as activated carbon powder or polyacene as a major constituent, a conductive material such as carbon black and carbon whisker and a binder such as polytetrafluoroethylene, polyvinylidene fluoride, and carboxymethylcellulose. The mixture is kneaded under existence of liquid lubricant such as alcohol, formed like a sheet by rolling or in like manner, and dried. Then, the product is joined to both of surfaces of the metallic collector by thermo-compression bonding, through conductive bond, or in like manner. Although there is no limit in the thickness of the electrode layer, the ordinary range is about from 100 to 500 µm.

Further, instead of the kneading, the electrode layer may be formed by painting a slurry made by mixing the binder to a solvent such as water and N-methyl-pyrrolidone on both of the surfaces of the metallic collector and drying the surfaces.

The separators 33a and 33b may be an ion-permissible porous separator, wherein micro-cellular polyethylene film, micro-cellular polypropylene film, polyethylene bonded fabric, polypropylene bonded fabric, bonded fabric mixed with glass fiber, glass mat filter, cellulosic bonded fiber, rayon bonded fiber, or the like is preferably used.

After accommodating the winding element 50 into the case 60, the electrolyte is supplied to the inside of case 60 to impregnate the electrodes 31 and 32 in the electrolyte, and the upper end of the metallic case 60 is caulked with the sealing lid 63 to hermetically seal, the electrochemical device is formed. At the time of caulking, it is preferable to use a gasket made from an insulating material such as silicon rubber, butyl rubber, ethylene-polypropylene rubber, polypropylene. The electrolyte may be supplied from the inlet in the sealing lid after hermetically sealing this.

The electrolyte to be used is those publicly known, e.g. aqueous solutions of sulfide, sodium sulfate, sodium hydroxide, potassium hydroxide, ammonium hydroxide, potassium chloride, potassium carbide, and so on in the water-soluble material.

Further, in the organic solvent materials, those expressed by general formulas $R^1$, $R^2$, $R^3$, $R^4$, $N^+$ and $R^1$, $R^2$, $R^3$, $R^4$, $P^+$, where $R^1$, $R^2$, $R^3$ and $R^4$ represent alkyl groups of which carbon numbers is about 1 to 6, and $R^1$, $R^2$, $R^3$, and $R^4$ may be the same or different. It is preferable to use a solution obtained by dissolving a solute such as $BF_4$ salt, $ClO_4$ salt and $PF_6$ salt of such as quaternary ammonium ion and quaternary phosphonium ion, and salt like $LiBF_4$, $LiClO_4$, $NaPF_6$, and $LiPF_6$ into one or more of organic solvents such as polypropylene carbonate, ethylene carbonate, γ-butyrolactone, acetonitrile, dimethylformamide, sulfolane, 1,2-dimethoxyethane, nitromethane, dimethylcarbonate, diethylcarbonate, and ethyl methyl carbonate.

The material of the case 60 may be the same as that of the negative collector 32a or the negative collector plate 73, wherein copper, nickel, stainless steel, nickel-plated steel, and aluminum are suitable. Especially, in Embodiment 1, a material which is scarcely broken by machining of a bead and provides a sufficient force of retaining the winding element 50 by the bead is preferable, wherein stainless steel is excellent.

Although in this specification, embodiments are exemplified using the first electrode as the positive electrode and the second electrode as the negative electrode. However, the first electrode may be a negative electrode and the second electrode may be a positive electrode.

Industrial Applicability

According to the present invention, the first and second strip-like portions of the cylindrical winding element are wound so as to position on opposite end surfaces of the cylindrical winding element, and the first and second collector plates are respectively collect electricity through the connections with the strip-like portions of the first and second electrodes, whereby the tab-like collecting lead is not specially required, the processing is facilitated, and the production time can be shortened. Further, it is unnecessary to provide a space for accommodating the tab-like collecting leads in the case, it is possible to provide the electrochemical device having a high volume density per a unit volume.

Further, since the first and second collector plates are respectively connected to the first and second strip-like portions, it is possible to reduce variation of the electric resistance of the electrochemical device. Further, by connecting the first collector plate with the first terminal or adopting a monolithical structure and connecting the second connector plate with the second terminal or adopting a monolithical structure, it is possible to make the electrochemical device firm and the vibration proof of the electrochemical device becomes excellent. Further, by using an identical material for the first electrode, the fist collector plate, and the first terminal or using an identical material for the second electrode, the second collector plate, and the second terminal, the connections becomes secured and the internal resistance can be reduced.

As described, since the electrochemical device according to the present invention has a high volume density and a low resistance, it is preferably used for usage requiring a high energy and/or a high output. Further, since the vibration proof is excellent, it is possible to use, for example, in electric vehicles and so on.

The entire disclosure of Japanese Patent Application No. 11-278841 filed on Sep. 30, 1999 including specification, claims, drawings and summary are incorporated herein by reference in its entirety.

What is claimed is:

1. An electrochemical device comprising:
   a first electrode having electrode layers on at least one of surfaces of a strip shaped first collector other than a first strip shaped portion along a side of a strip shaped longitudinal direction of the first collector;
   a second electrode having electrode layers formed on at least one of surfaces of a strip shaped second collector other than a second strip shaped portion along a side of a strip shaped longitudinal direction of the second collector;
   strip shaped separators configured to electrically insulate the first electrode from the second electrode by intervening therebetween;
   a first collector plate configured to collect electricity from a connection with the first strip shaped portion, said first collector plate welded to said first strip shaped portion;
   a second collector plate configured to collect electricity from a connection with the second strip shaped portion, said second collector plate welded to said second strip shaped portion;
   a case having an opening portion configured to accommodate the first electrode, the second electrode, the separators, the first collector plate, and the second collector plate;
   a sealing lid configured to seal the opening portion;
   a first terminal connected to the first collector plate or monolithically formed with the first collector plate so as to be connected to an outside of the case;
   a second terminal connected to the second collector plate or monolithically formed with the second collector plate so as to be connected to an outside of the case, wherein the first terminal and the second terminal are respectively connected to the sealing lid and the case, the first electrode, the second electrode, and the separators are piled and wound to form a tubiform winding element, the first strip shaped portion and the second strip shaped portion are arranged respectively on opposite end surfaces of the cylindrical winding element.

2. The electrochemical device according to claim 1, wherein the wound first strip shaped portion and the wound second strip shaped portion are crushed toward a tube axis of the tubiform winding element.

3. The electrochemical device according to claim 1, wherein materials of the first collector, the first collector plate, and the first terminal are the same, and materials of the second collector, the second collector plate and the second terminal are the same.

4. The electrochemical device according to claim 2, wherein materials of the first collector, the first collector plate, and the first terminal are the same, and materials of the second collector, the second collector plate and the second terminal are the same.

5. The electrochemical device according to claim 1, further comprising:

a core penetrating through a center portion of the tubiform winding element, wherein the first terminal or the second terminal has an inlet for an electrolyte and a hollow path through which the electrolyte flows, and the core has an inflow port, to which the electrolyte flows from a connection with the hollow path in the first terminal, an outflow port, from which the electrolyte flows, and a hollow cavity connecting the inflow port to the outflow port.

6. The electrochemical device according to claim 2, further comprising:

a core penetrating through a center portion of the tubiform winding element, wherein the first terminal or the second terminal has an inlet for an electrolyte and a hollow path through which the electrolyte flows, and the core has an inflow port, to which the electrolyte flows from a connection with the hollow path in the first terminal, an outflow port, from which the electrolyte flows, and a hollow cavity connecting the inflow port to the outflow port.

7. The electrochemical device according to claim 3, further comprising:

a core penetrating through a center portion of the tubiform winding element, wherein the first terminal or the second terminal has an inlet for an electrolyte and a hollow path through which the electrolyte flows, and the core has an inflow port, to which the electrolyte flows from a connection with the hollow path in the first terminal, an outflow port, from which the electrolyte flows, and a hollow cavity connecting the inflow port to the outflow port.

8. The electrochemical device according to claim 4, further comprising:

a core penetrating through a center portion of the tubiform winding element, wherein the first terminal or the second terminal has an inlet for an electrolyte and a hollow path through which the electrolyte flows, and the core has an inflow port, to which the electrolyte flows from a connection with the hollow path in the first terminal, an outflow port, from which the electrolyte flows, and a hollow cavity connecting the inflow port to the outflow port.

9. The electrochemical device according to claim 1, wherein the first collector plate or the second collector plate has a cutout or a hole, through which an electrolyte flows to the tubiform winding element.

10. The electrochemical device according to claim 2, wherein the first collector plate or the second collector plate has a cutout or a hole, through which an electrolyte flows to the tubiform winding element.

11. The electrochemical device according to claim 3, wherein the first collector plate or the second collector plate has a cutout or a hole, through which an electrolyte flows to the tubiform winding element.

12. The electrochemical device according to claim 4, wherein the first collector plate or the second collector plate has a cutout or a hole, through which an electrolyte flows to the tubiform winding element.

13. The electrochemical device according to claim 5, wherein the first collector plate or the second collector plate has a cutout or a hole, through which an electrolyte flows to the tubiform winding element.

14. The electrochemical device according to claim 6, wherein the first collector plate or the second collector plate has a cutout or a hole, through which an electrolyte flows to the tubiform winding element.

15. The electrochemical device according to claim 8, wherein the first collector plate or the second collector plate has a cutout or a hole, through which an electrolyte flows to the tubiform winding element.

16. The electrochemical device according to claim 1, wherein the electrochemical device is an electric double-layer capacitor.

17. The electrochemical device according to claim 2, wherein the electrochemical device is an electric double-layer capacitor.

18. The electrochemical device according to claim 3, wherein the electrochemical device is an electric double-layer capacitor.

19. The electrochemical device according to claim 5, wherein the electrochemical device is an electric double-layer capacitor.

20. The electrochemical device according to claim 9, wherein the electrochemical device is an electric double-layer capacitor.

* * * * *